Figure 1:
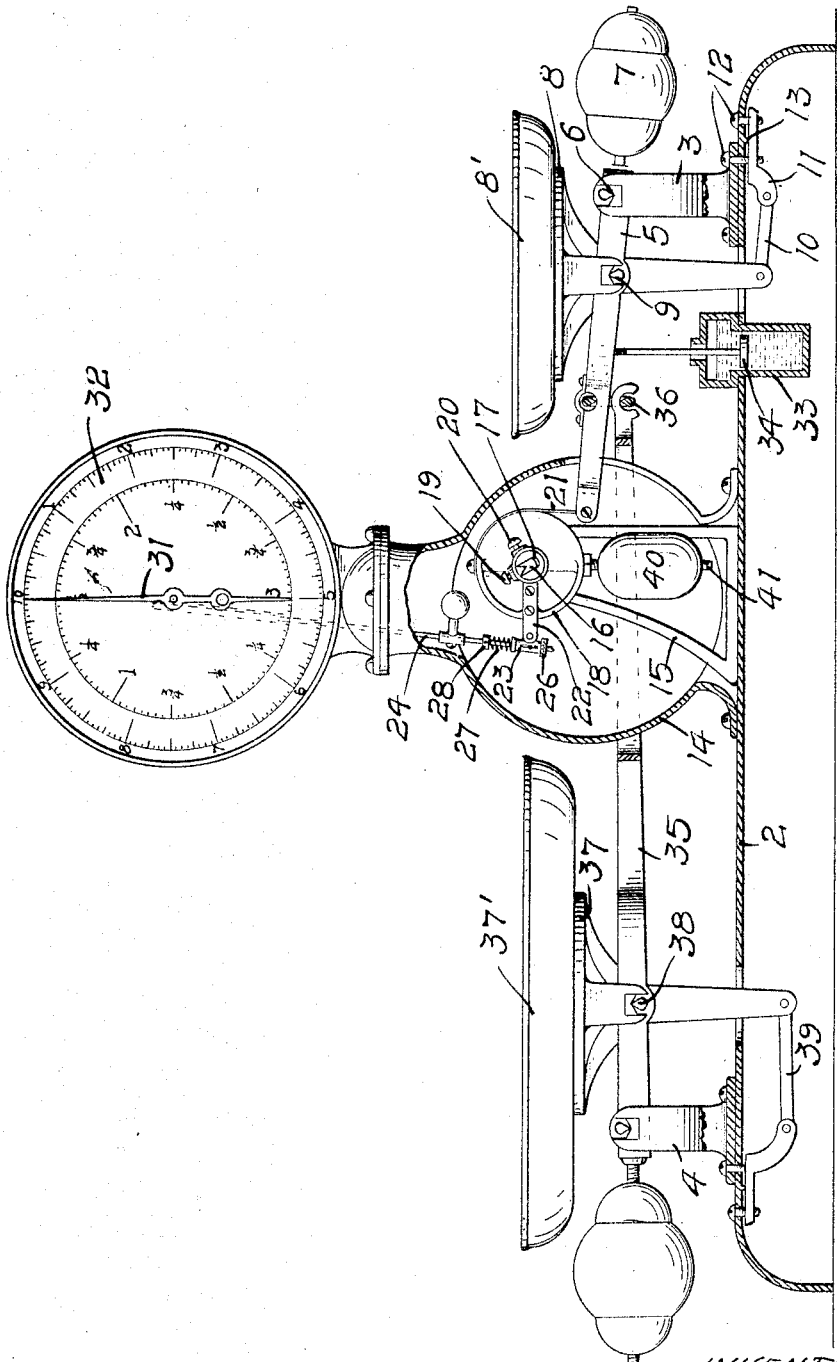

N. NILSON.
SCALE.
APPLICATION FILED JULY 17, 1908.

946,767.

Patented Jan. 18, 1910.
2 SHEETS—SHEET 1.

WITNESSES

INVENTOR
NILS NILSON
BY Paul & Paul
HIS ATTORNEYS

N. NILSON.
SCALE.
APPLICATION FILED JULY 17, 1908.
946,767.
Patented Jan. 18, 1910.
2 SHEETS—SHEET 2.
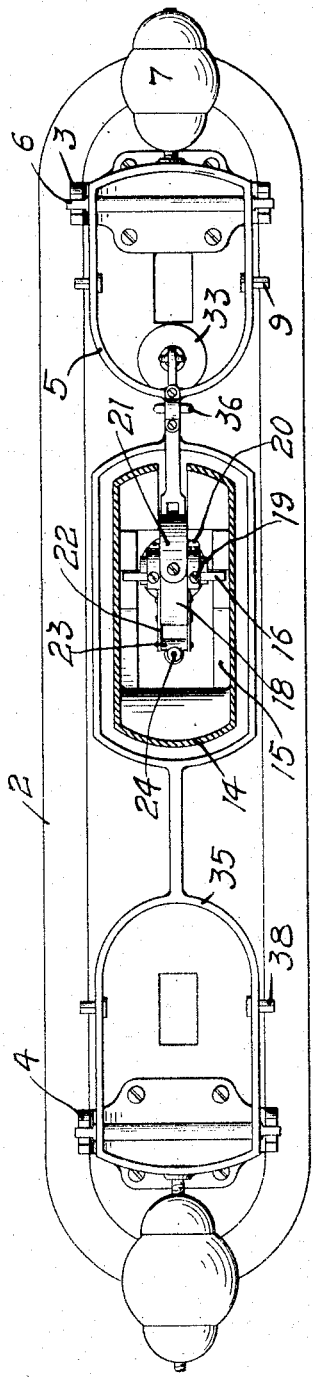
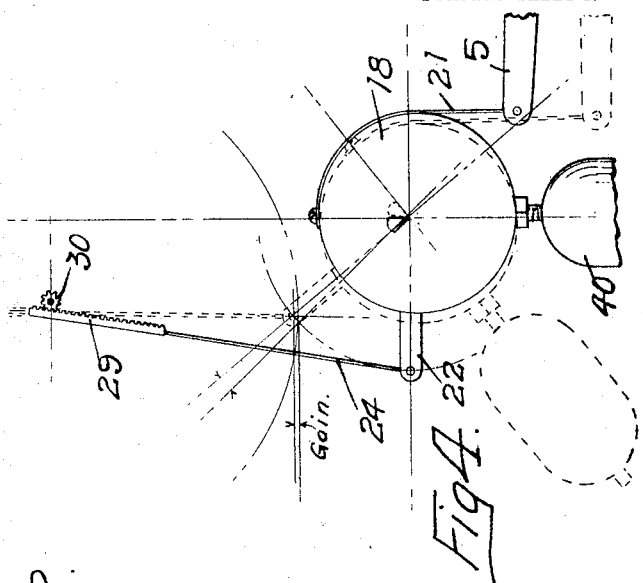
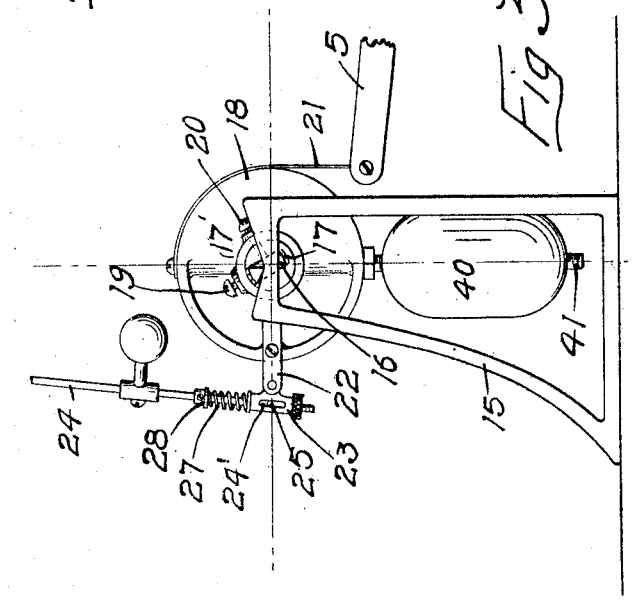
WITNESSES
INVENTOR
NILS NILSON
BY
HIS ATTORNEYS

UNITED STATES PATENT OFFICE.

NILS NILSON, OF WAYZATA, MINNESOTA.

SCALE.

946,767.  Specification of Letters Patent.  Patented Jan. 18, 1910.

Application filed July 17, 1908. Serial No. 443,977.

*To all whom it may concern:*

Be it known that I, NILS NILSON, of Wayzata, Hennepin county, Minnesota, have invented certain new and useful Improvements in Scales, of which the following is a specification.

The object of my invention, is to provide a scale which will weigh very light or heavy articles accurately, and indicate the weight on a dial having uniformly spaced graduations.

The invention consists generally of various constructions and combinations, all as hereinafter described and particularly pointed out in the claims.

In the accompanying drawings forming part of this specification, Figure 1 is a front view partially in section of a weighing scale embodying my invention, Fig. 2, is a horizontal sectional view of the same, Fig. 3, is a detailed view illustrating the mechanism for transmitting the movement of the scale beam to the indicator. Fig. 4, is a diagrammatic view illustrating the movement of the eccentrically pivoted wheel to which the rod controlling the indicator hand is connected.

In the drawing, 2 represents a suitable base whereon standards 3 and 4 are mounted, 5 is a scale beam pivoted at 6 on the standards 3, and having a suitable balance weight 7. A scale platform 8 supports a pan 8' and has bearings 9 on the said beam and extends down through the base 2 and is connected by a link 10 with a plate 11 that is adjustably secured to the base by means of screws 12 and a rib 13 on which the said plate is adapted to rock when the screws are adjusted to obtain the desired adjustment of the platform with respect to the scale beam.

14 is a housing mounted on the base 2 within which standards 15 are provided and forming supports for a bar 16 which has knife edge bearings at its ends on said standards, and adapted to slide within a slot 17 provided in the hub 17' of a wheel 18. This slot extends radially through the center of the hub and set screws 19 are mounted in the wheel, and adapted to engage the bar 16 and move it in said slot toward or from the center of the wheel and thereby regulate the degree of eccentricity of the bar with respect to the center of the wheel. If desired, the bar may be adjusted until it coincides with the center of the wheel or it may be allowed to slide away from the center until the wheel is eccentrically supported. The hub 17' is capable of rotary adjustment in the wheel and when set in the desired position, is locked by means of set screws 20. This construction allows a double adjustment of the bar 16. It may be moved radially in the slot 17 toward or from the center of the wheel and by loosening the screws 20, may be rotated with the hub independently of its adjustment in the slot. A flexible strap 21 is secured at one end to the periphery of the wheel and at its other end to the scale beam 5.

Secured to the wheel 18 on each side thereof are arms 22 projecting radially beyond the periphery of the wheel 18 and between which a box 23 is pivoted. A rod 24 has a threaded end adapted to slide in said box and is prevented from turning therein by a slot 24' in the wall of the box and a pin 25 on said rod. A thumb nut 26 on the threaded end of said rod bears on the box and a spring 27 is coiled on said rod between the said box and a stop 28 on said rod. By turning the thumb nut, the effective length of the rod may be increased or decreased as desired. This rod has a rack bar 29 at its upper end adapted to engage a pinion 30 on the post of the indicator hand 31 that is adapted to move past the graduations of a dial 32, having an inner and an outer circle of graduations thereon. The inner circle of graduations is adapted for indicating the weight of comparatively light articles placed on the scale pan 8' while the outer circle of graduations is for indicating the weight of articles placed on the other scale pan, as will hereinafter appear.

A dash pot device, consisting of a cup 33, adapted to contain a suitable liquid and having a plunger 34 connected to the scale beam 5, regulates the travel of said beam and prevents any sudden jerking or jar of the scale which might result when a heavy article is thrown on the pan. A second scale beam 35 has bearings on the standards 4, and is provided with a balance weight corresponding to the one described, and is connected with the beam 5 by a link 36. A scale platform 37 for the heavier articles supports a pan 37' and is pivoted at 38 on the beam 35 and is provided with a link 39 that is connected to a plate secured to the base 2, and adapted to tilt thereon in the same manner as the plate 11 heretofore described. The pan 37' is adapted to receive a heavier article to be weighed, the outer circle of graduations on the dial being utilized to indicate the weight of the article on the pan.

It is desirable in a scale of this type, both from a manufacturers' and an ornamental standpoint, to provide a dial having uniformly spaced graduations. The arms 22, connecting the indicator operating rod with the wheel 18, move on the arc of a circle and as indicated in Fig. 4, the travel of this rod would be greater following the arc of this circle, than if it moved in a straight line. This increase or gain in the travel of the rod, necessitates differently spaced graduations on the dial to obtain accurate results, and to obviate this necessity and provide a dial with uniformly spaced graduations, I provide an eccentrically mounted pivot for the wheel 18 through which the movement of the scale beams is transmitted to the indicator hand. This eccentric pivot has been described in detail and its effect is to decrease the distance between the point where the power is applied and the pivot of the wheel, and thereby lessen the travel of the wheel and the movement of the weight, and compensate for the gain resulting from the movement of the indicator operating rod on a curved line. The beam weight 40 adjustably supported on the rod 41, depending from the wheel 18, normally hangs in a vertical position when the scale is at rest and is swung toward a horizontal position during the operation of weighing. The degree of eccentricity of the wheel pivots, may be varied until the variation in the leverage of the scale beams thereon will compensate for the gain in the movement of the operating rod, and I am able by this means to obtain very accurate results with the scale and use a dial having uniformly spaced graduations.

I claim as my invention:—

1. In a scale, the combination with a scale beam and its supports, of a dial having graduations arranged on a curved line thereon, an indicator hand for said dial, a wheel circular in form having eccentrically arranged knife edge bearings, means for increasing or decreasing the eccentricity of said wheel bearing, a beam weight carried by said wheel, flexible means connecting said wheel with said scale beam, means for transmitting the movement of said wheel to said indicator hand, the gain in the travel of said means through the arc of a circle being compensated for by the decrease in the leverage of said beam on said balance wheel, substantially as described.

2. In a scale, the combination with a scale beam, and its supports, of a dial having graduations arranged on a curved line thereon, an indicator hand for said dial, a wheel circular in form having adjustable eccentrically arranged knife edge bearings, a beam weight carried by said wheel, flexible means connecting said wheel with said scale beam, means for transmitting the movement of said wheel to said indicator hand, the leverage of said beam on said beam weight decreasing through the eccentricity of the pivots of said wheel to compensate for the gain in the travel of said connecting means, whereby uniformly spaced graduations may be placed on the dial substantially as described.

3. In a scale, the combination with a scale beam, and its supports, of a dial having graduations arranged on a curved line thereon, an indicator hand for said dial, a wheel circular in form having a radial slot extending through the center thereof a block having knife edge bearings radially adjustable in said slot, a beam weight carried by said wheel flexible means connecting said wheel with said scale beam, and means for transmitting the movement of said wheel to said indicator hand, substantially as described.

4. In a scale, the combination with a scale beam, of a dial having graduations arranged on a curved line thereon, an indicator hand for said dial, a wheel circular in form having eccentrically arranged knife edge pivots, flexible means connecting said wheel with said scale beam, a beam weight carried by said wheel, arms projecting radially from said wheel a rod pivotally connected with said arms and adjustable with respect thereto, and having an operative connection with said indicator hand, the pivotal connection of said rod and wheel swinging on the arc of a circle, and the eccentricity of said knife edge pivots compensating for the increase in travel of said rod, and permitting uniform spacing of the graduations on the dial.

5. In a scale, the combination with a scale beam, and its supports, of a dial having graduations arranged on a curved line thereon, an indicator hand for said dial, a wheel circular in form having eccentrically arranged knife edge bearings, a beam weight carried by said wheel, flexible means connecting said wheel with said scale beam, arms secured to said wheel and projecting radially therefrom, a rod having an adjustable pivotal connection with said arms and operatively connected with said indicator hand, for the purpose specified.

6. In a scale, the combination with a scale beam, of a dial having graduations arranged on a curved line thereon, an indicator hand for said dial, a wheel circular in form having knife edge pivots, flexible means connecting said wheel with said scale beam, a beam weight carried by said wheel, arms secured to said wheel and projecting radially therefrom, a box pivotally supported between said arms, a threaded rod slidably mounted in said box, and having a thumb nut and a coiled spring arranged to be put under tension by the adjustment of said nut, said rod having means preventing rotary movement thereof in said box and operatively connected with said indicator hand.

7. In a weighing scale, two scale beams arranged substantially in line with one another and having platforms and balance weights, and means connecting the end of one beam with the corresponding end of the adjoining beam, a dial having an indicator hand, and means having a beam weight operatively connecting one of said beams with said hand.

8. In a scale, the combination with a base, of standards mounted thereon, scale beams having knife edge bearings on said standards and provided with balance weights, scale pans having knife edge bearings on said beams, said beams lapping by one another, a link having knife edge bearings on said beams, a wheel having a flexible connection with one of said beams, a beam weight, a dial having an inner and outer circle of graduations, an indicator hand therefor, means connecting said wheel with said indicator hand, the outer circle of graduations indicating the weight of the article placed in one pan, and the inner circle of graduations indicating the weight of the article placed in the other pan, substantially as described.

9. In a scale, the combination with a scale beam and its supports, of a dial and an indicator hand therefor, a wheel, a hub capable of rotary adjustment in said wheel and having a radial slot, a bar having knife edge bearings adjustable in said slot, a beam weight carried by said wheel, flexible means connecting said wheel with said scale beam and means for transmitting the movement of said wheel to said indicator hand.

10. In a scale, the combination with a scale beam and its supports, of a dial and an indicator hand therefor, a hub having eccentric bearings capable of rotary adjustment in said wheel, flexible means connecting said wheel with said scale beam, means for transmitting the movement of said beam to said indicator hand and a beam weight carried by said wheel.

11. In a scale, the combination with a scale beam and its supports, of a dial having graduations and an indicator hand therefor, a wheel having eccentric bearings, said bearings being capable of radial and rotary adjustment in said wheel, means connecting said wheel with said scalebeam, a beam weight carried by said wheel and means for transmitting the movement of said wheel to said indicator hand.

12. In a scale, the combination, with two scale beams having bearings and balance weights on one side of said bearings, platforms carried by said beams on the opposite side of said bearings from said balance weights, means pivotally connecting said beams with one another, a beam weight common to both of said beams, an indicator, and means operatively connecting a beam with said indicator.

13. In a scale, the combination with two scale beams having knife edge bearings and balance weights on one side of said bearings, scale platforms mounted on said beams on the opposite side of said bearings from said balance weights, said beams being pivotally connected to one another, a dial having an indicator hand and means having a beam weight operatively connecting said hand with one of said beams, 14. In a weighing scale, two scale beams having platforms and balance weights, said beams being substantially in line with one another and having a link connection between them, one beam having a comparatively long arm between its pivotal support and said link, and the other beam having a comparatively short arm between its pivotal support and said link, a dial having an indicator hand, and means having a beam weight operatively connecting one of said beams with said hand.

15. In a weighing scale, two scale beams having platforms and balance weights, said beams being substantially in line with one another, the end of one beam lapping by the corresponding end of the other beam, a link connection between said lapping ends, a dial having an indicator hand, and means having a beam weight operatively connecting one of said beams with said hand.

16. In a scale, the combination, with two scale beams having bearings and balance weights on one side of said bearings, platforms carried by said beams on the opposite side of said bearings from said balance weights, means pivotally connecting said beams with one another, and an indicator operatively connected with one of said beams.

17. In a scale, the combination, with two scale beams having bearings, one of said beams having a balance weight on one side of its bearing, platforms for said beams on the opposite side of the bearing from said balance weight, means pivotally connecting said beams with one another, and an indicator operatively connected with one of said beams.

In witness whereof, I have hereunto set my hand this 15th day of July 1908.

NILS NILSON.

Witnesses:
RICHARD PAUL,
JULIA A. BYINGTON.